No. 672,706. Patented Apr. 23, 1901.
F. M. KENNEDY.
SHAFT AND JOURNAL THEREFOR.
(Application filed July 25, 1900.)
(No Model.)
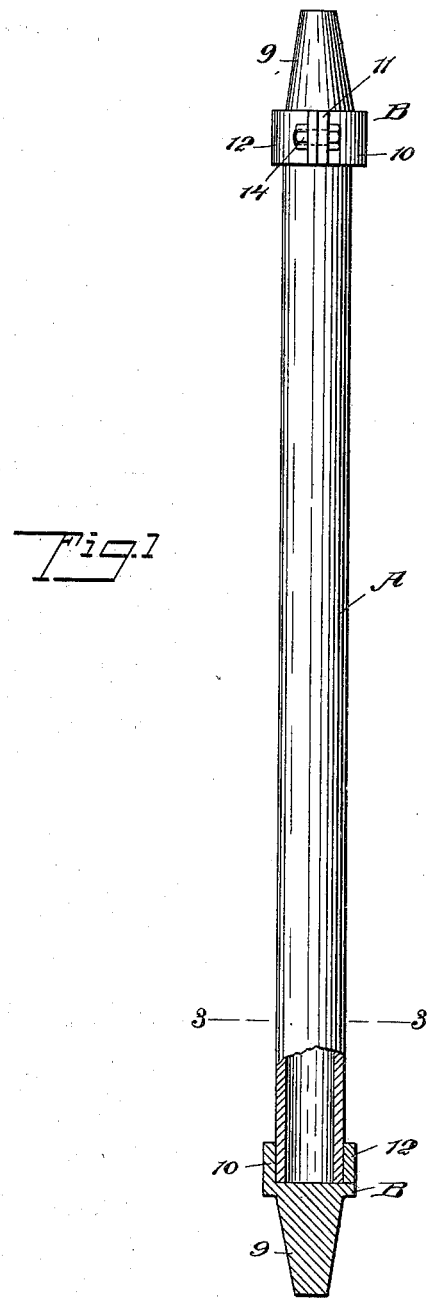
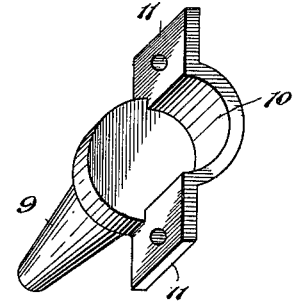
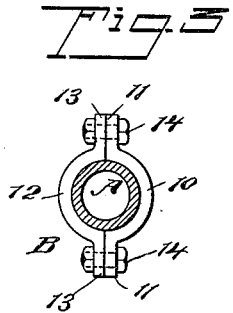
WITNESSES:
INVENTOR
Frank M. Kennedy
BY
ATTORNEYS

UNITED STATES PATENT OFFICE.

FRANK M. KENNEDY, OF CLARENDON, ARKANSAS, ASSIGNOR TO JANE W. STONE, OF BROOKLYN, NEW YORK.

SHAFT AND JOURNAL THEREFOR.

SPECIFICATION forming part of Letters Patent No. 672,706, dated April 23, 1901.

Application filed July 25, 1900. Serial No. 24,792. (No model.)

*To all whom it may concern:*

Be it known that I, FRANK M. KENNEDY, of Clarendon, county of Monroe, and State of Arkansas, have invented certain new and useful Improvements in Shafts and Journals Therefor; and I do hereby declare that the following is a full, clear, and exact description of the invention, which will enable others skilled in the art to which it appertains to make and use the same, reference being had to the accompanying drawings, and to the characters of reference marked thereon, which form part of this specification.

The invention relates to shafts and journals therefor.

The purpose of the invention is to provide a journal-bearing for a shaft, especially a tubular shaft, which journal is provided with a separable collar, one section of which is integral with the journal, whereby the journal may be conveniently secured to the shaft.

The invention consists in the novel construction and combination of the several parts, as will be hereinafter fully described, and pointed out in the claims.

Reference is to be had to the accompanying drawings, forming a part of this specification, in which similar characters of reference indicate corresponding parts in all the figures.

Figure 1 is a side elevation of a tubular shaft and the journals for the same, one end of the shaft and one journal appearing in section. Fig. 2 is a detail view of a separable journal detached from the shaft, and Fig. 3 is a transverse section on the line 3 3 of Fig. 1.

Heretofore in mounting shafting of the character embraced in my invention great difficulty has been experienced in adjusting the journals of the shafting. I am particularly desirous of using tubular shafting with a view to obtaining proper lightness and rigidity and have therefore devised a journal-bearing for the shaft having a conical journal end and a body portion of a semicircular contour integral therewith, with projecting diametrical ears or flanges, and a semicircular portion having outwardly-projecting or diametric ears or flanges, the ears or flanges of the two parts being coincidentally perforated, whereby through the use of bolts the journal ends or bearings may be clamped upon the tubular shaft.

A designates a tubular shaft, and B a journal end for the shaft, which journal end comprises a bearing portion 9, usually conical, having integral therewith a semicircular clamping portion 10, provided with diametrically opposite points or flanges 11, with a coacting semicircular clamping-plate 12, having diametrically opposite ears or flanges 13, the flanges 11 and 13 being coincidentally perforated to receive bolts 14, by which the journal is securely clamped upon the shaft A.

What I claim is—

1. A journal end for a shaft, consisting of a conical bearing portion having integral therewith a semicircular clamping portion, which clamping portion is provided with diametrically opposite points or flanges, and a coacting semicircular clamping plate or portion, also provided with diametrically opposite ears or flanges, the ears or flanges of both portions of the journal end being coincidentally perforated, the perforations being adapted to receive bolts, for the purpose described.

2. The combination, with a hollow shaft, of a journal end consisting of a tapering body, a separable collar, one end of one section of which collar is secured to the inner end of the body, both sections of the collar having diametrical flanges provided with apertures, which apertures are adapted to receive bolts, the collar being adapted to span the said hollow shaft, as and for the purpose specified.

In testimony that I claim the foregoing as my own I hereby affix my signature in presence of two witnesses.

FRANK M. KENNEDY.

Witnesses:
  WILLIAM WEBSTER,
  MAUD SCHUMACHER.